United States Patent
Doerry et al.

(10) Patent No.: US 6,424,287 B1
(45) Date of Patent: Jul. 23, 2002

(54) ERROR CORRECTION FOR IFSAR

(75) Inventors: Armin W. Doerry; Douglas L. Bickel, both of Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 0 days.

(21) Appl. No.: 09/841,852

(22) Filed: Apr. 24, 2001

(51) Int. Cl.[7] ............................................. G01S 13/00
(52) U.S. Cl. ......................................................... 342/25
(58) Field of Search ........................... 342/25, 159, 162, 342/189, 190, 191, 192, 194, 196

(56) References Cited

U.S. PATENT DOCUMENTS

| | | | |
|---|---|---|---|
| 5,179,383 A | * | 1/1993 | Rane et al. ..................... 342/25 |
| 5,332,999 A | * | 7/1994 | Prati et al. ..................... 342/25 |
| 5,334,980 A | * | 8/1994 | Decker .......................... 342/25 |
| 5,424,743 A | | 6/1995 | Ghiglia et al. ................. 342/25 |
| 5,659,318 A | * | 8/1997 | Madsen et al. ................ 342/25 |
| 6,181,270 B1 | * | 1/2001 | Dwyer ........................... 342/25 |

OTHER PUBLICATIONS

Doren, N.; Wahl, D.E., "Implementation of SAR interferometric map generation using parallel processors," Geoscience and Remote Sensing Symposium Proceedings, 1998. IGARSS '98. 1998 IEEE nternational, vol. 5, 1998, pp.(s): 2640–264.*

Franceschetti, G.; Iodice, A.; Migliaccio, M.; Riccio, D., "On the baseline decorrelation," Geoscience and Remote Sensing Sympsium, 1996. IGARSS '96. 'Remote Sensing for a ustainable Future.', International, vol. 1, 1996, pp.(s): 680–682.*

Thomas J. Flynn; Phase Unwrapping Using Discontinuity Optimization SAND 97–3118C, Sandia National Laboratories.

D. L. Bickel & W. H. Hensley; Design, Theory, and Applications of Interferometric Synthetic Aperture Radar for Topographic Mapping; SAND96–1092; Printed May 1996; pp. 1–85.

C. D. Knittle, N. E. Doren and C. V. Jakowatz; A Comparison of Spotlight Synthetic Aperture Radar Image Formation Techniques; SAND96–2460; Printed Oct. 1996; pp. 1–30.

* cited by examiner

Primary Examiner—Thomas H. Tarcza
Assistant Examiner—Brian Andrea
(74) Attorney, Agent, or Firm—George H. Libman

(57) ABSTRACT

IFSAR images of a target scene are generated by compensating for variations in vertical separation between collection surfaces defined for each IFSAR antenna by adjusting the baseline projection during image generation. In addition, height information from all antennas is processed before processing range and azimuth information in a normal fashion to create the IFSAR image.

12 Claims, 5 Drawing Sheets

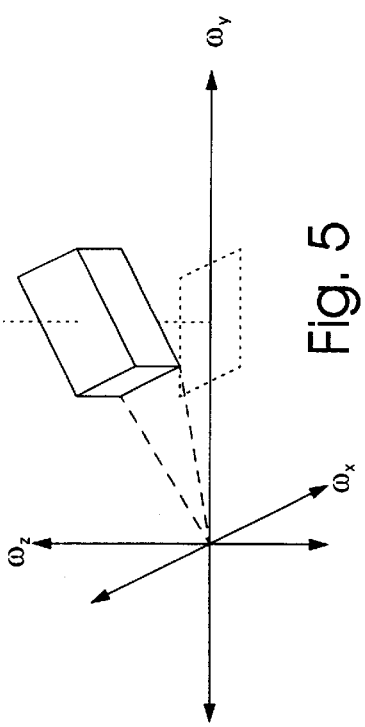
Fig. 5
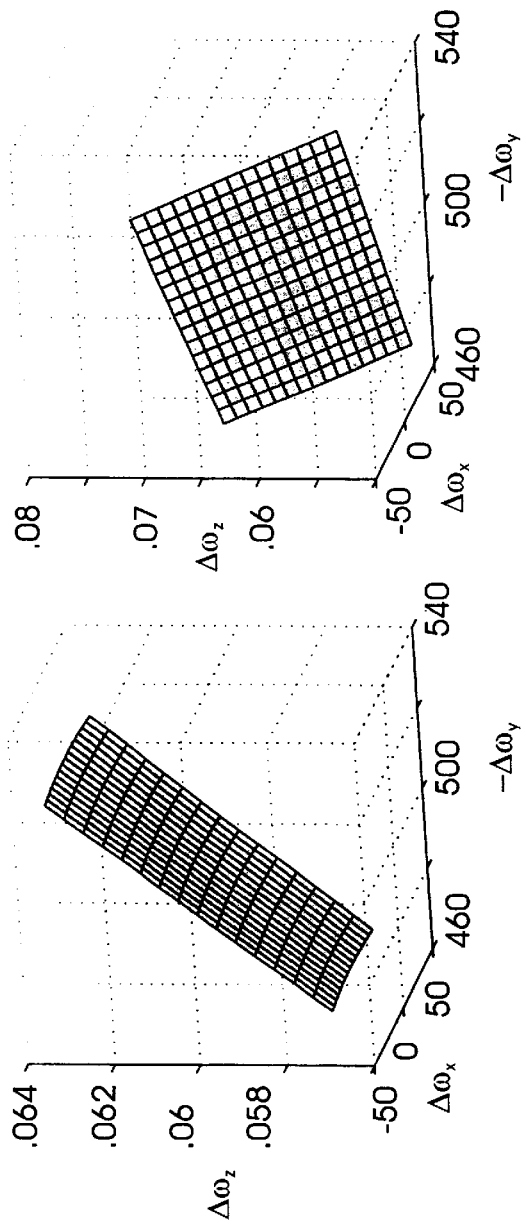
Fig. 6(b)
Fig. 6(a)

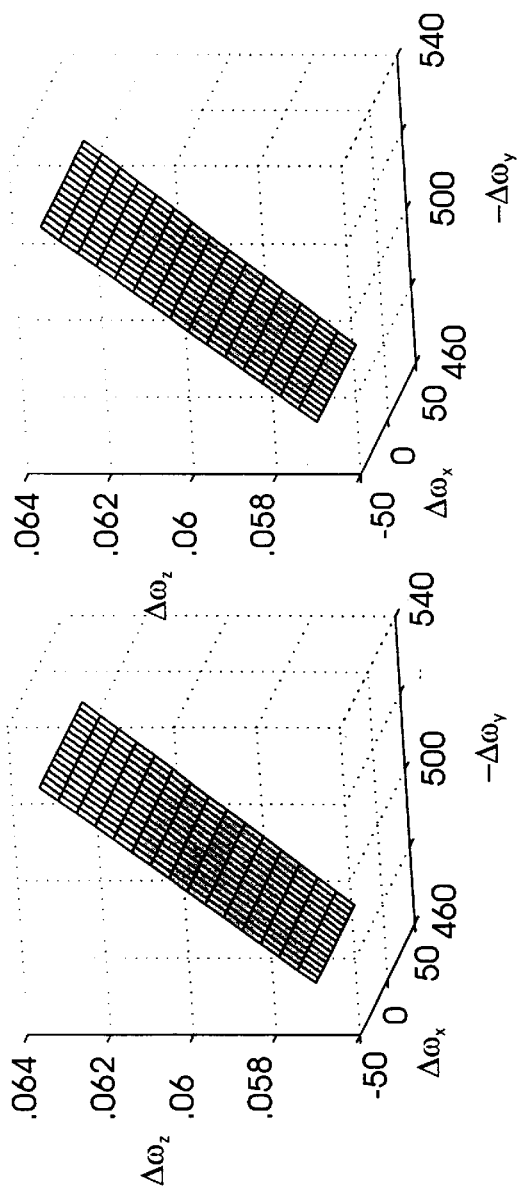
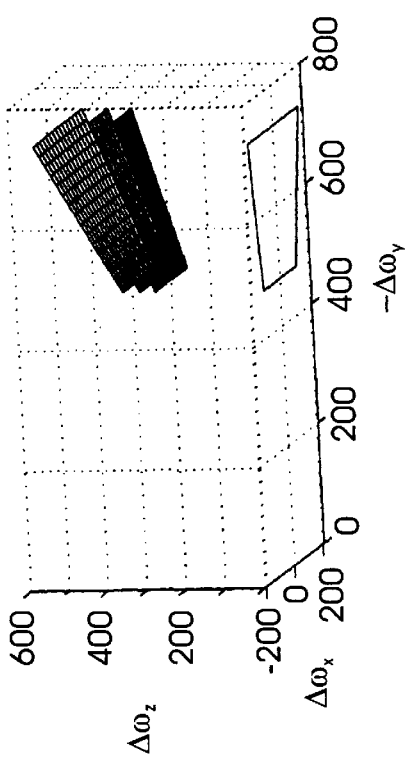
Fig. 7a
Fig. 7b
Fig. 8

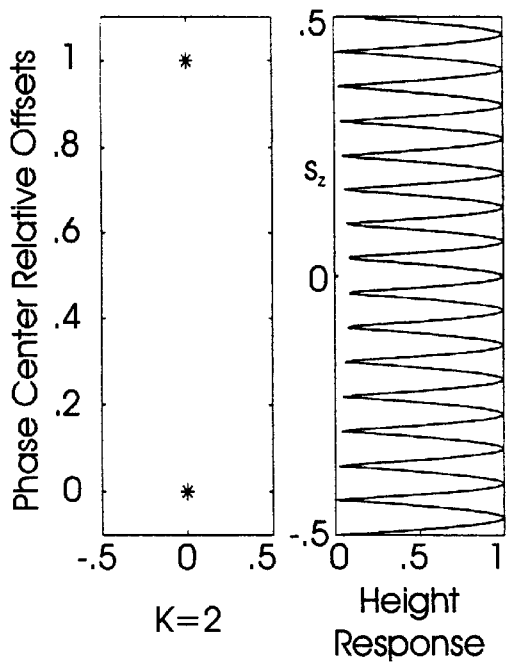
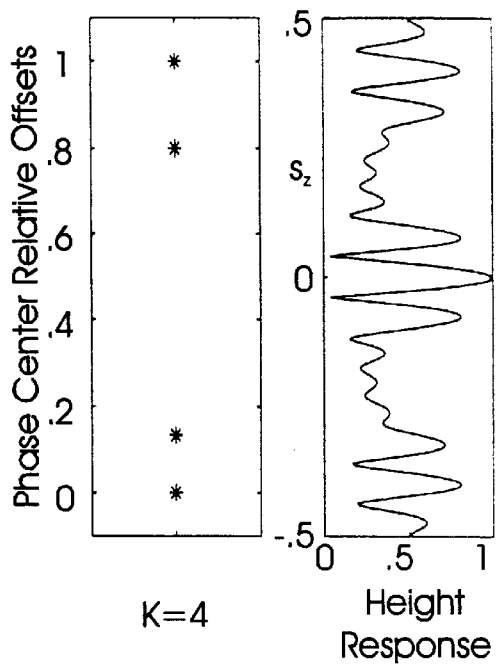
Fig. 9a  Fig. 9b
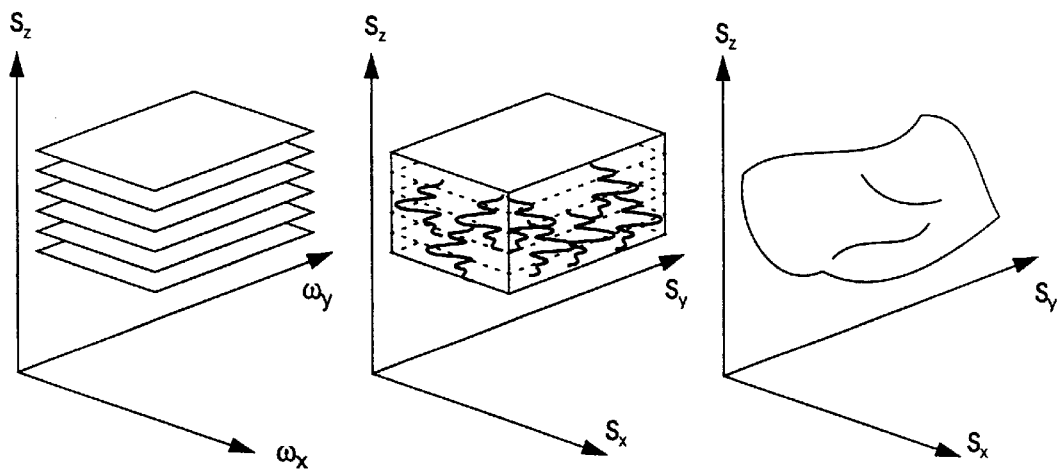
Fig. 10a  Fig. 10b  Fig. 10c

ERROR CORRECTION FOR IFSAR

The United States Government has rights in this invention pursuant to Department of Energy Contract No. DE-AC04-94AL85000 with Sandia Corporation.

CROSS RBEFERENCE TO RELATED APPLICATIONS (Not Applicable)

BACKGROUND OF THE INVENTION

Synthetic aperture radar (SAR) was first developed in the 1950's and utilizes an antenna looking to the side from a vehicle moving along a path to produce high resolution two-dimensional radar images. Because scanning is provided by the movement of the antenna, a small SAR antenna has the ability to have the resolution of a very large antenna. SAR systems currently make two dimensional images having resolution on the order of less than a foot.

Interferometric SAR (IFSAR) extends traditional two dimensional SAR processing to three dimensions by utilizing the phase difference between two SAR images taken from different elevation positions to determine an angle of arrival for each pixal in the scene. This angle, and the two-dimensional location information in the traditional SAR image, are transfomed into geographic coordinates, including height information, if the position and motion parameters of the antennas are known accurately.

IFSAR traditionally comprises a pair of antennas which are rigidly mounted with respect to each other and move along a path and collect at least two channels of data from many positions along the path. The typical IFSAR image is formed by using range and azimuth information to compute a complex SAR image for each antenna, and then cross correlating these images on a pixel-by-pixel basis to form the IFSAR image. The phase difference between corresponding pixels is attributed to target height, and a phase-unwrapping process may be used to resolve ambiguities.

For a quick review, let the IFSAR collection geometry be defined by FIG. 1. For a typical application, the radar uses a Linear-FM chirp, stretch processing, and quadrature sampling, as is well known in the art. Neglecting residual video phase errors, the phase of the video signal from an echo of an ideal point target located at s can be modeled approximately as $$\Phi_{video}(i, n, k) \approx \left\{ \frac{4\pi}{c} \left[ f_{n,k} + B_{eff,n,k}\left(\frac{i}{I}\right) \right] (|r_{c,n,k}| - |r_{c,n,k} - s|) \right\}, \quad \text{eq. 1}$$

where
- i=ADC sampling index ($-I/2 \leq i \leq I/2-1$);
- n=azimuth position index ($-N/2 \leq n \leq N/2-1$);
- k=IFSAR antenna phase center index (k=0,1 for single baseline IFSAR);
- $r_{c,n,k}$=vector from scene center to the effective phase center of the antenna;
- s=vector from scene center to the target location;
- $f_{n,k}$=nominal center frequency for the sampled received pulse; and
- $B_{eff,n,k}$=effective bandwidth within the sampled data that determines range resolution.

Note that this formulation allows center frequency and bandwidth to vary as a function of both pulse number and antenna index. Furthermore, ADC sample times are chosen to track the scene center, that is, such that i=0 after a delay corresponding to the nominal range to the scene center $2|r_{c,n,k}|/c$.

For a target located with x-y-z coordinates ($s_x, s_y, s_z$), we can expand $$(|r_{c,n,k}| - |r_{c,n,k} - s|) \approx s_x \cos \psi_{n,k} \sin \alpha_{n,k} - s_y \cos \psi_{n,k} \cos \alpha_{n,k} + s_z \sin \psi_{n,k}$$

where $\psi$ is a grazing angle from the respective antenna phase centers, and $\alpha$ is an azimuth angle.

While errors from this approximation need to be dealt with in high-performance IFSAR processing, this approximation is nevertheless adequate to explore motion compensation issues and other IFSAR features.

As shown in FIG. 2, within the Fourier space of the target scene, the video samples from a single pulse at a single antenna position describe a linear sequence of samples over a radial segment $$\left(\frac{4\pi}{c}\right)\left[f_{n,k} + \frac{(B_{eff,n,k})i}{I}\right]$$

at polar angles $\alpha_{n,k}$ and $\psi_{n,k}$. Because the AC pulse is chirped (i.e., its frequency changes value with time), the target scene is represented as a straight line having a length indicative of the change in frequency. For a single antenna phase center in motion (fixed k), the collection of pulses is a series of generally parallel lines (displaced from each other by the movement of the antenna) which describe a collection surface in Fourier space.

Multiple antenna phase centers (multiple k) describe multiple collection surfaces (one for each antenna) in the same Fourier space. FIG. 3 shows the collection surfaces for the two vertically-arranged antennas of an IFSAR with broadside squint angle and constant waveform parameters. (Squint angle is the angle projected on the ground plane between the line of travel of the antenna and the line from the antenna to the target. Broadside squint means the line to the target it perpendicular to the direction of travel.) The two surfaces define a 3-dimensional volume that is effectively a 3-dimensional aperture in Fourier space.

To facilitate spatial coherence between the two images, each collection surface for prior art systems is typically cropped and resampled such that their projections onto the plane $\omega_z = 0$ is a common region, which ideally is rectangular. Note that the small bands at either end of the projection are not common regions, as only the upper surface contributes to the lower band and only the lower surface contributes to the upper band. The height information exists between the spaced collection surfaces, but accurate height information is difficult to determine if the surfaces are offset from one another, as shown, and common elements from each surface do not project to the $\omega_z = 0$ It has previously been proposed that a nearly common trapezoidal projection may be accomplished by pulse-to-pulse adjustment of center frequency in the manner $f_{n,k} = \kappa_{n,k} f_{0,0}$, where $f_{0,0}$ is a nominal constant value, and $$\kappa_{n,k} = \frac{\cos\psi_{0,0}}{\cos\psi_{n,k}\cos\alpha_{n,k}}.$$

(See C. Jakowatz et al., *Spotlight-Mode Synthetic Aperture Radar: A Signal Processing Approach*, ISBN 0-7923-9677-4, Kluwer Academic Publishers, 1996.) Such adjustment improves the sitation, but does not resolve all errors.

SUMMARY OF THE INVENTION

It is an object of this invention to cause the collection surfaces to overlap to remove the need for cropping out some of the information.

It is another object of this invention to process height information earlier in the process to correct errors that otherwise distort the result.

To achieve the foregoing and other objects, and in accordance with the purpose of the present invention, as embodied and broadly described herein, the present invention may comprise a method of generating an IFSAR image of a target scene by transmitting and receiving a series of pulses from an IFSAR device having at least a pair of receiving antennas, the distance between said antenna phase centers being represented by a baseline projection, the method comprising:compensating for variations in vertical separation between collection surfaces defined for each antenna by adjusting the baseline projection during image generation. Furthermore, the invention comprises processing height information from all antennas before processing range and azimuth information in a normal fashion to create the IFSAR image.

Additional objects, advantages, and novel features of the invention will become apparent to those skilled in the art upon examination of the following description or may be learned by practice of the invention. The objects and advantages of the invention may be realized and attained as particularly pointed out in the appended claims.

BRIEF DESCRIPTION OF THE DRAWINGS

The accompanying drawings, which are incorporated in and form part of the specification, illustrate an embodiment of the present invention and, together with the description, serve to explain the principles of the invention.

FIG. 5 shows a collection volume after traditional cropping and resampling of the surfaces FIG. 4.

FIGS. 6a and 6b show, respectively, broadside and squint angle examples of collection plane vertical separation prior to this invention.

FIGS. 7a and 7b show the same examples as FIG. 6 after pulse-to-pulse baseline modulation in accordance with the invention.

FIG. 8 shows three collection surfaces resulting from three IFSAR antennas.

FIGS. 9a and 9b show height responses as a function of two antenna effective phase center distributions FIGS. 10a–10c show 3-D polar format processing steps according to the invention.

DETAILED DESCRIPTION OF THE INVENTION

This invention is a result of a realization that taking a Fourier Transform along a line that includes multiple IFSAR antennas and finding a signal peak is equivalent to traditional IFSAR processing in terms of locating the height of an object. Additionally, optimal application of this realization requires a reordering of conventional IFSAR processing steps.

As discussed above, the traditional processing involves making an aziumuth and a range transform for each antenna, and then making a height transform to complete IFSAR processing. As discussed hereinafter, the height transform is preferably completed first in order to correct certain errors that otherwise limit the quality of the ultimate IFSAR result. Subsequently, this data is then transformed in the azimuth and range to yield a 3-dimensional reflectivity volume map estimate of the scene. Finally, a peak detection operation along the height dimension for each range and azimuth location extracts the desired height and location information.

Figure 1:
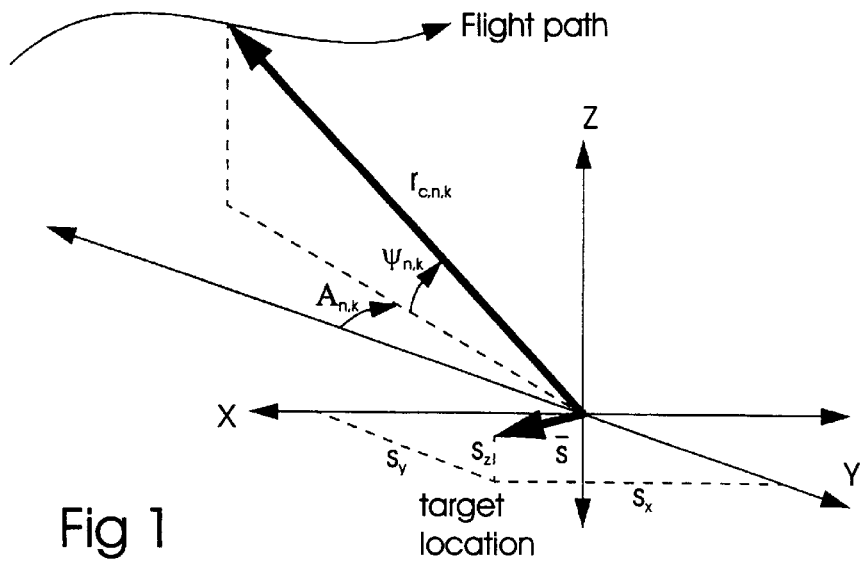
FIG. 1 shows target scene geometry for a SAR.
Figure 2:
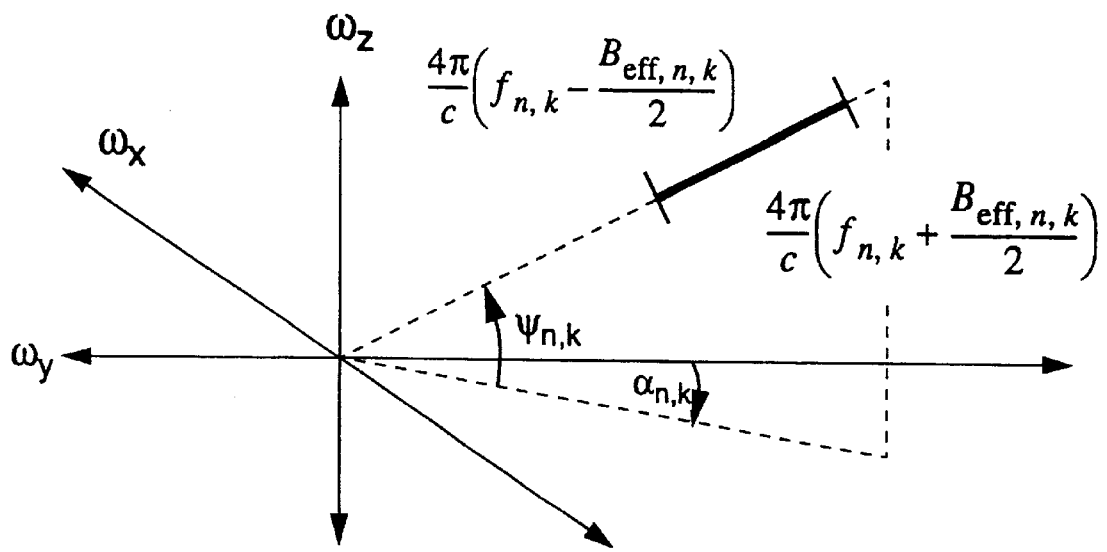
FIG. 2 shows the Fourier space view of a target scene for a single antenna and pulse.
Figure 3:
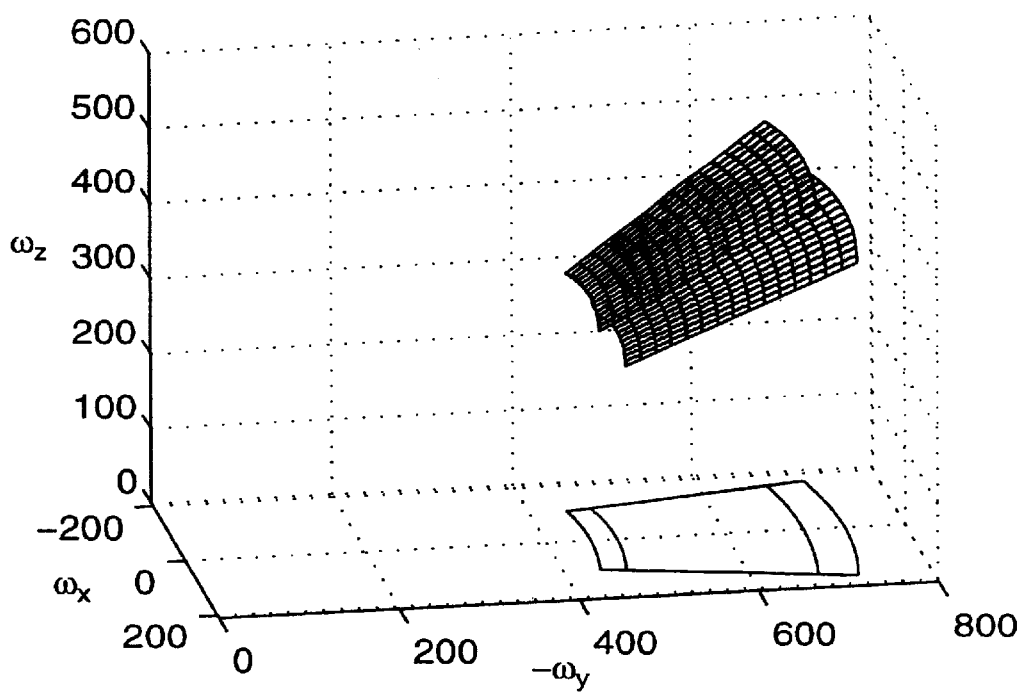
FIG. 3 shows IFSAR collection surfaces in Fourier space.

As noted above, the spatial coherence of the images of FIG. 3 may be improved by cropping and resampling, or by pulse-to-pulse adjustment of the center frequency. In accordance with this invention, this latter technique may be further improved by also adjusting the bandwidth, a technique often employed to optimize processing for any single SAR image, but which has not previously been proposed to force a common projection of collection surfaces. In particular, bandwidth should be adjusted on a pulse-to-pulse basis such that $B_{eff,n,k}=\kappa_{n,k}B_{eff,0,0}$ where $B_{eff,0,0}$ is a nominal constant value. For broadside squint, this adjusting of waveform parameters, i.e. frequency and chirp rate (bandwidth for a given pulse width) results in the improved collection surfaces of FIG. 4, where each element of one surface is seen to be in vertical alignment with the corresponding element of the other plane. If azimuth samples are collected such that $\tan \alpha_{n,k}=\tan \alpha_{n,0}=d\alpha \cdot n$ for some constant $d\alpha$, then a rectangular projection is achieved merely by a linear resampling in the azimuth direction. These waveform parameter adjustments, which are made as a function of the data collection geometry to optimally place samples in the Fourier space of the image, are referred to hereinafter as 'real time motion compensation. One skilled in the art will recognize that a nearly equivalent adjustment to frequency and bandwidth also may be obtained by the pulse-to-pulse adjustment of ADC (analog-to-digital converter) sampling times and rates during the received pulse's echo time. This method may be preferable if the same transmitted pulse is intended to be received by both (or all) antennas.]

The ideal 3-D Fourier collection volume from a processing standpoint is a rectangular parallelepiped (rectangular box) described by independent spatial frequency ranges, or $\Phi_{ideal}=\omega_x s_x+\omega_y s_y+\omega_z s_z$, with $\omega_{x_1} \leq \omega_x \leq \omega_{x_2}$, $\omega_{y_1} \leq \omega_y \leq \omega_{y_2}$, and $\omega_{z_1} \leq \omega_z \leq \omega_{z_2}$, and with each side parallel to one of the three orthogonal planes. However, the typical collection volume (after traditional IFSAR pre-processing including cropping and resampling) looks closer to a more general parallelepiped, as is illustrated in FIG. 5, with sides in vertical planes, but a top and bottom that are neither parallel nor horizontal. While not quite ideal, this non-rectangular parallelepiped is a substantial improvement over the volume of FIG. 3 because of its vertical sides.

The non-horizontal top and bottom faces indicate a coupling of $\omega_y$ and $\omega_z$ components, which means that processing parallel to these faces results in measuring a linear sum of $s_y$ and $s_z$ components. This is precisely the range layover effect in SAR images. Nevertheless, conventional processing in the $\omega_x$ direction yields a unique value for $s_x$, and processing in the $\omega_z$ direction yields a unique value for $s_z$. Furthermore, as is well known, once $s_z$ is determined, the layover can be removed to generate a true 3-D surface rendering, and an ortho-rectified image.

Figure 4:
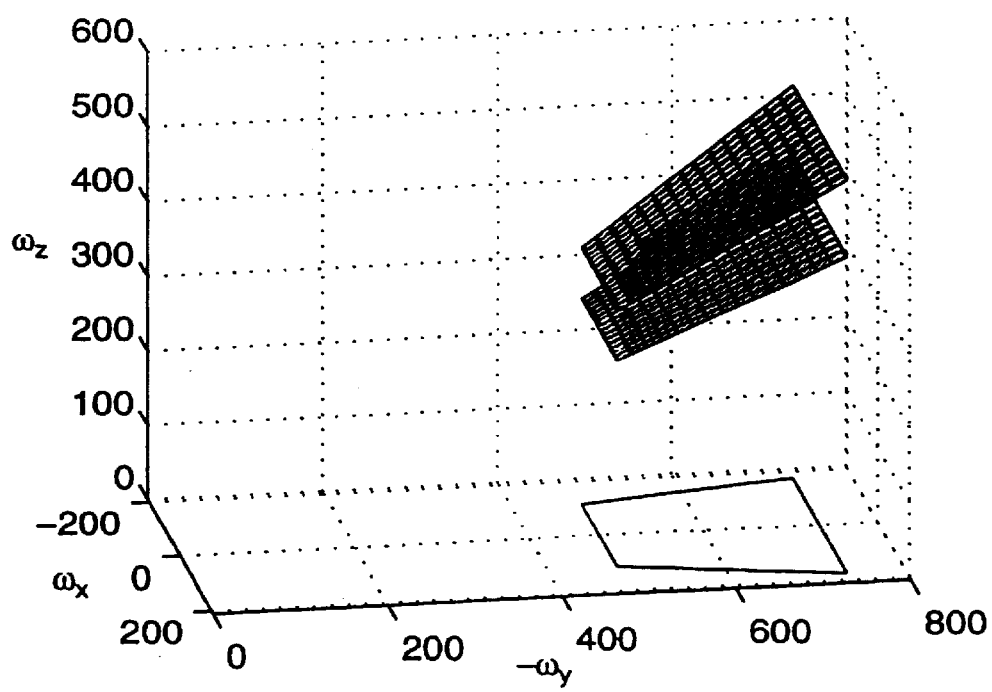
FIG. 4 shows the surfaces of FIG. 3 with motion-compensated waveform parameters.

However, the fact that the two collection surfaces of FIG. 4 are not strictly parallel either to each other or one of the graph coordinate is generally ignored by conventional IFSAR processing and leads to errors resulting in a diminishment in the height accuracy and precision of the eventual 3-d surface rendering. This effect is exacerbated at the finer resolutions of higher-performance IFSAR systems.

This invention recognizes a new form of processing that is equivalent to conventional SAR processing, yet provides for improved error correction. Consider a vertical line passing thru the center of the projection of the parallelepiped of FIG. 5 onto the $\omega_z=0$ plane. Let this line intersect the collection surfaces where i=0, and $\alpha_{n,k}=0$. The vertical separation between the two collection surfaces along this line is given by $$\Delta\omega_x = \frac{4\pi}{\lambda_{0,0}}\cos\psi_{0,0}(\tan\psi_{0,1} - \tan\psi_{0,0}) \approx \frac{4\pi}{\lambda_{0,0}}\left(\frac{\Delta\psi_{0,1}}{\cos\psi_{0,0}}\right),$$

where $\lambda_{0,0} = \dfrac{c}{f_{0,0}} = $ nominal wavelength, and $\Delta\psi_{0,1}=\psi_{0,1}-\psi_{0,0}$, which is presumed to be small because the IFSAR antennas are typically located physically close to each other. In other words, the baseline distance (which, typically, will be on the order of one meter) is very small compared to the range to the target (which, typically, is thousands of meters).

The general angular difference $\Delta\psi_{n,k}$ relates to the baseline length between effective phase centers as $\Delta\psi_{n,k}=b_\perp/|r_{c,n,0}|$, where $b_\perp$ is the length of the projection of the actual baseline in the direction of the target scene (perpendicular to $r_{c,n,0}$).

For the parallelepiped of FIG. 5, the separation $\Delta\omega_z$ holds even after normal range compression and Doppler compression (i.e. image formation). Between the two images so formed, a discrete Fourier transform (DFT) across collocated pixels in the $\omega_z$ direction yields an impulse response of the general form $$\frac{\sin(\Delta\omega_z s_z)}{\sin(\Delta\omega_z s_z/2)}$$

with nominal lobe width $$\rho_z \approx \frac{2\pi}{\Delta\omega_z} = \frac{\lambda_{0,0}}{2(\Delta\psi_{0,1}/\cos\psi_{0,0})}.$$

It is well understood by those of ordinary skill in the art that the location of the peak of this lobe yields the maximum likelihood estimate of $s_z$. Traditionally, this calculation assumes that the surfaces are parallel, when, in fact, they are not.

However, in accordance with this invention, by making the presumption that the target scene manifests itself as a thin reflecting surface with but a single target height for any location, then target height may be resolved to something with much finer precision than the just-calculated $\rho_z$. The ability to super-resolve target height becomes dependent on the Signal-to-Noise (SNR) ratio in the respective pixels. The problem is now one of spectral estimation, or estimating the location of a single spectral peak in noise.

It has been shown [see R. McDonough et al., *Detection of Signals in Noise*, 2nd ed., ISBN 0-12-744852-7, Academic Press, 1995] that the variance of the location of the spectral peak can be expressed as $$\sigma_x^2 = \frac{1}{SNR(\Delta\omega_z)^2} = \left(\frac{\lambda_{0,0}}{4\pi}\frac{\cos\psi_{0,0}}{\Delta\psi_{0,1}}\right)^2\left(\frac{1}{SNR}\right).$$

This expression relates the super-resolved height-noise to SNR, and is identical to the more conventionally derived expression based on phase noise between the two phase centers, recognizing that the Cramer-Rao bound for phase noise variance relates to large SNR by the well-known expression $\sigma_\phi^2=1/SNR$ As a final note, if the $\omega_z$ dimension is sampled too coarsely for the target scene content (i.e., $\Delta\omega_z$ is too big), then aliasing will occur in the spatial domain. This is, of course, the phase-ambiguity problem that plagues many IFSARs. However, DFT with peak finding is now seen to be equivalent to more conventional correlation angle measurement. This validates the equivalence of IFSAR to super-resolved, under-sampled, 3-D SAR.

From Equation 1, the actual vertical separation between collection surfaces is seen to vary depending on the location on the collection surface (indices i and n), and is expressed by $$\Delta\omega_{x,i,n} = \frac{4\pi}{c}\left[f_{0,0} + B_{eff,0,0}\left(\frac{i}{I}\right)\right]\frac{\cos\psi_{0,0}}{\cos\alpha_{n,0}}(\tan\psi_{n-1} - \tan\psi_{n,0})$$

$$\approx \frac{4\pi}{c}\left[f_{0,0} + B_{eff,0,0}\left(\frac{i}{I}\right)\right]\frac{\cos\psi_{0,0}}{\cos\alpha_{n,0}}\left(\frac{b_\perp}{|r_{c,n,0}|}\right) \text{ for } b_\perp \ll |r_{c,n,k}|.$$

This variation of vertical frequency separation (bandwidth) is plotted in FIG. 6(a) for a Ku-band IFSAR operating at a broadside squint angle with a 1 ft. baseline at 5 km range, 45° depression angle, and 4-inch image resolution. While the dominant change in vertical bandwidth $\Delta\omega_z$ is across the $\omega_y$ direction for broadside imaging (with index i), this is not necessarily true for severe squint angles, as is illustrated in FIG. 6(b). As squint angles become more severe, substantial variation in $\Delta\omega_z$ will occur as a function of azimuth angle $\alpha_{n,k}$. Of course, correction of errors arising from the vertical separation of FIG. 6(b) is much more difficult than for errors in only one direction as in FIG. 6(a).

Ignoring this dependence of spatial frequencies on more than one index value generates migration of spectral peaks as a function of the undesired indices. Consequently, if ordinary 2-D images are formed from this data (transforming across indices i and n in the model of equation 1 for each antenna k), then the location of a scatterer at height $s_z$ depends on index k. Eventually, for large enough $s_z$, this migration will be entirely to an adjacent resolution cell, thereby decorrelating the two images for that particular pixel location. This effect is exacerbated at finer resolutions and more severe squint angle. (In other words, the top and bottom collection surfaces in Fourier space are significantly non-parallel, and pretending that they are parallel (which is what normal IFSAR processing does) will cause imprecise and noisy and perhaps indescernable height estimates for objects significantly above or below the nominal image height. This phenomena is well known to IFSAR designers and analysts as "height decorrelation", an aspect of "spatial decorrelation".)

In accordance with this invention, the dependence on $\alpha_{n,k}$ can be mitigated, even for severe squint angles, by adjusting the baseline projection $b_\perp$ as a function of the pulse-to-pulse geometry. For example, if $$b_\perp \to b_{\perp,n,1} = b_{\perp,0,1}\cos\alpha_{n,0}\left(\frac{\cos\psi_{n,0}}{\cos\psi_{0,0}}\right)^2\left|\frac{r_{c,n,0}}{r_{c,0,0}}\right|,$$

then it can be verified that $\Delta\omega_{z,i,n}=\Delta\omega_{z,i,0}$ has no further dependence on azimuth angle $\alpha_{n,0}$. With this pulse-to-pulse modification to the baseline, the collection plane vertical separations of FIG. 6 become as shown in FIG. 7, and indicate a substantially stabilized vertical bandwidth, especially with squint angle. Additionally, the baseline could be modulated within a single pulse to flatten $\Delta\omega_z$ across the $\omega_y$ direction.

To implement this correction, the baseline distance between antennas may be modulated on a pulse-to-pulse basis via a mechanical baseline adjustment between antenna pairs. For example, one antenna can slide along a track and have its position on the track adjusted by a motor or piston. Alternatively, the antennas can be mounted on a bar that permits them to rotate relative to the baseline while still keeping the target in their field of view to change the proejction length. And phase center adjustment can be utilized in an electrically programmable phased array.

Furthermore, the baseline distance between antennas may be modulated during any particular pulse by antenna structures and configurations whose phase center location is frequency dependent. One such embodiment is a phased array whose element modules use programmable filters to shape the total aperture illumination, and hence the net phase center, in a frequency dependent manner.

The stabilization of $\Delta\omega_z$ could also be accomplished by adjusting radar frequencies, but doing so would adversely affect the other dimensions.

So far, the discussion has been directed to a single pair of collection surfaces with a single baseline. Clearly, as is well known, as baseline separation increases, $\Delta\omega_z$ increases, and finer vertical resolution (less height noise) is achievable, but at a cost of greater ambiguity due to the undersampling of the target scene. While ever more exotic phase unwrapping algorithms might be employed, the more straightforward solution is to add more antenna phase centers at different baseline separations. This increases the number of non-coplanar collection surfaces in Fourier space. In the models for video phase, this simply allows the antenna index k to be extended, to perhaps $0 \leq k \leq K-1$, where K is the total number of antenna phase centers. Consequently, with proper real-time motion compensation, equation (1) is still valid, but can be further extended to $$\Phi_{video}(i,n,k) \approx \frac{4\pi}{c}\left[f_{0,0} + B_{\mathit{eff},0,0}\left(\frac{i}{I}\right)\right](\cos\psi_{0,0})\left(\begin{array}{c} s_x\tan\alpha_{n,0} - s_z\frac{\tan\psi_{n,0}}{\cos\alpha_{n,0}} + \\ \frac{s_z}{\cos\alpha_{n,0}\cos^2\psi_{n,0}}\left(\frac{b_{\perp,n,k}}{|r_{c,n,0}|}\right) \end{array}\right)$$

where $b_{\perp,n,k}$ is the projected baseline between a reference antenna (k=0) and the effective phase center due to another antenna of interest, with index k>1. Collection surfaces compensated in this manner are illustrated in FIG. 8.

The natural question is "What are the optimal set of baselines $b_{\perp,n,k}$ for a given number of phase centers K?"

Returning to the 3-D SAR model, this question becomes "How should a finite number of array elements be spaced to maximize spatial resolution with minimum ambiguity?" This is, in fact, a well-studied problem in antenna theory that goes by any of several names including "sparse arrays", "thinned arrays", and "aperiodic arrays". (See, for example, B. Steinberg, *Principles of Aperture and Array System Design*, ISBN 0-147-82102-0, John Wiley & Sons, Inc., 1976.)

FIG. 9 illustrates how additional effective phase centers might help in selecting the proper $s_z$ from an otherwise ambiguous set. It should be noted that since we make the a priori assumption of a single height for every $(s_x, s_y)$ pair, sidelobes in the $s_z$ direction need to be diminished only to the point of achieving proper noise margin.

The fundamental principle governing conventional 2-D polar format processing of SAR images is a recognition of the non-rectangular region of projection onto the plane $\omega_z=0$ for the raw phase history data. For the typical analysis of a constant waveform and constant depression angle, this amounts to a segment of an annular ring. Furthermore, an efficient digital 2-D transform to the spatial domain requires first resampling the Fourier domain data such that their projections are onto a rectangular grid. These steps eliminate the significant migration that would otherwise limit SAR image quality, especially away from the scene center. Elements of these resampling steps can often be incorporated into both the real-time motion compensation as previously discussed, and also perhaps into the transform itself (See W. Lawton, "A New Polar Fourier Transform for Computer-Aided Tomography and Spotlight Synthetic Aperture Radar", IEEE Transactions on Acoustics, Speech, and Signal Processing, Vol. 36, No. 6, June 1988.)

In a similar manner, an extension of efficient polar format processing to three dimensions would seek to effectively resample the Fourier domain data to the parallelepiped of FIG. 5, with equally spaced samples parallel to all faces. As with 2-D processing, some of this can be done with proper real-time motion compensation, and some can be done in the course of transforming the data.

Consider data Collected with the real-time motion compensation described above. The collection surfaces would be stacked as in FIG. 8, and the video phase would be described by $$\Phi_{video}(i,n,k) \approx \frac{4\pi}{c}\left[f_{0,0} + B_{\mathit{eff},0,0}\left(\frac{i}{I}\right)\right](\cos\psi_{0,0})\left[\begin{array}{c} s_x d\alpha n - s_y + s_x\sqrt{1+d\alpha^2 n^2}\tan\psi_{n,0} + \\ \frac{s_z\sqrt{1+d\alpha^2 n^2}}{\cos^2\psi_{n,0}}\left(\frac{b_{\perp,n,k}}{|r_{c,n,0}|}\right) \end{array}\right]$$

Reformatting this data to eliminate migration involves resampling operations to eliminating any cross-coupling of indices i, n, and k. Normal 2-D polar reformatting of each collection plane is completed by resampling in azimuth to a new index n' such that $$\frac{4\pi}{c}\left[f_{0,0} + B_{\mathit{eff},0,0}\left(\frac{i}{I}\right)\right](\cos\psi_{0,0})d\alpha n \rightarrow \frac{4\pi}{c}[f_{0,0}](\cos\psi_{0,0}d\alpha n')$$

$$\frac{4\pi}{c}\left[f_{0,0} + B_{\mathit{eff},0,0}\left(\frac{i}{I}\right)\right](\cos\psi_{0,0})d\alpha n \rightarrow \frac{4\pi}{c}[f_{0,0}](\cos\psi_{0,0}d\alpha n')$$

However, reformatting in this manner still leaves substantially non-parallel collection surfaces as previously described. Were it possible, we might consider first resampling the Fourier-domain data in the $\omega_z$ direction to the equivalent of new baselines $b'_{\perp 0,k}$ such that $$\frac{4\pi}{c}\left[f_{0,0} + B_{\mathit{eff},0,0}\left(\frac{i}{I}\right)\right]\frac{\cos\psi_{0,0}\sqrt{1+d\alpha^2 n^2}}{|r_{c,n,0}|\cos^2\psi_{0,0}}b_{\perp,n,k} \rightarrow \frac{4\pi}{c}f_{0,0}\frac{b'_{\perp,n,k}}{|r_{c,n,0}|\cos\psi_{0,0}}$$

We also noted earlier that modulating the baselines on a pulse-to-pulse basis would accomplish much of this, especially for severe squint angles.

In any case, there is a preferable technique. By presuming for the moment that $\sqrt{1+d\alpha^2 n^2}\tan\psi_{n,0} \approx \sqrt{1+d\alpha^2 n'^2}\tan\psi_{n',0}$, the video phase becomes the following eq. 2:

$$\Phi_{video}(i,n,k) \approx$$

$$\left\{\begin{array}{c} \left(\frac{4\pi}{c}\right)\left[s_x(f_{0,0}\cos\psi_{0,0}d\alpha n') - s_y\left[f_{0,0} + B_{\mathit{eff},0,0}\left(\frac{i}{I}\right) + \frac{s_z f_{0,0} b'_{\perp,0,k}}{|r_{c,0,0}|(\cos\psi_{0,0})}\right] + \\ s_z\left(\frac{4\pi}{c}\left[f_{0,0} + B_{\mathit{eff},0,0}\left(\frac{i}{I}\right)\right]\cos\psi_{0,0}\sqrt{1+d\alpha^2 n^2}\tan\psi_{n',0}\right) \end{array}\right\}$$

Within the brackets, the first line represent the desired Fourier samples. However, there remain two problems to contend with regarding this equation. The first problem is that the expression in the second line represents remaining undesired coupling responsible for layover and height-of-focus perturbations. The second problem is the reliance upon resampling the baselines, that is, the Fourier-domain data in the $\omega_z$ direction. Even with baseline modulation this is somewhat impalpable, as it is difficult to directly interpolate just two samples to a plurality of other positions. Accordingly, the preferred teaching of this invention is a resampling followed by a transform. More particularly, the resampled output can be built right into the transform, as discussed below.

With respect to the first problem, an initial estimate of $s_z$ would allow compensating the undesired coupling response prior to transforms across indices i and n'. However, normal IFSAR processing leaves the resolution of $s_z$ as the final operation, after the transforms across indices i and n'. The solution is to first process between collection planes (across k) to allow compensating the offending term. Processing this dimension first also is instrumental in solving the second problem. The natural algorithm then becomes:

Step 1. Height Transform

There are relatively few collection planes, and hence Fourier-domain samples in the $\omega_z$ direction. Furthermore, these samples are generally not evenly spaced, and their spacing varies as a function of $\omega_x$ and $\omega_y$. This observation diminishes both the utility and the need for efficient transform algorithms in this dimension. However, the scale-change property of the Fourier Transform states, "a linear time-scale change of $\gamma$ yields a linear frequency-scale change of $1/\gamma$, as well as a spectral magnitude change of $1/|\gamma|$." Consequently, scaling $b_{\perp n,k}$ prior to a transform is equivalent to scaling the result after the transform. However, in the end, what is desired are stable and uniformly scaled estimates of vertical position $s_z$.

All these considerations direct us to implementing matched filtering for a common set of $s_z$ at each $\omega_x$ and $\omega_y$. (Matched filtering is a well known technique which yields an optimal output with noisy inputs. In this context, it is the minimum mean-squared-error solution for any of a set of $s_z$.) That is, as illustrated in FIG. 10a, we process across collection surfaces in the $\omega_z$ direction to multiple but specific layers of $s_z$, prior to any azimuth or range compression, with the appropriate matched filter changing as a function of indices i and n.

To facilitate eventual $s_z$ peak location, the spacing between $s_z$ layers should be no greater than the nominal lobe width $$\rho_z \approx \frac{2\pi}{\Delta\omega_z}$$

due to the largest collection-surface separation. The number of $s_z$ layers should encompass the range of $s_z$ that might be expected for the scene of interest. Depending on $\rho_z$, this number might be no more than a small handful, something on the order of twice the total number of phase wraps due to the widest separated phase centers, from the lowest to highest points in the scene.

Step 2. Data Correction

At this point each layer is corrected for layover and height-of-focus perturbations using corrective adjustments to the phases of the partially processed data as discussed above with reference to equation 2. This step also ortho-rectifies the eventual images, a step which in the prior art is performed as a final step, after a 3-D rendereing has been formed.

Step .3. Layer Processing

Each $s_z$ layer can now complete 2-D polar format processing in the usual manner. The result of this step is illustrated in FIG. 10b.

Step 4. Surface Extraction

The result of the prior processing steps is a data set describing a rectangular parallelepiped in the spatial domain, with dimensions $s_x$, $s_y$, and $s_z$. The a priori presumption that the target scene is a single reflecting surface indicates that but a single valid $s_z$ exists for each $s_x$, $s_y$ pair.

Extracting this surface now amounts to super-resolving a single maximum peak in the $s_z$ direction for each $s_x$, $s_y$ pair, which may be accomplished by finding the largest magnitude in any vertical column of data. Clearly, we might advantageously use contextual information and other assistance from adjacent $s_x$, $s_y$ pairs, as is often done with more typical implementations of IFSAR. Of course, residual ambiguities due to undersampling $\omega_z$ for the range of heights in the scene still need to be resolved, as they manifest as multiple $s_z$ peaks. However, this is the same problem as the phase-unwrapping ambiguity in more typical IFSAR, and is readily solved by those of ordinary skill in this art, to yield a surface topography as shown in FIG. 10c.

In this manner, a single height can ultimately be assigned to each horizontal location, resulting in a typical IFSAR product.

The particular sizes and equipment discussed above are cited merely to illustrate a particular embodiment of this invention It is intended that the scope of the invention be defined by the claims appended hereto.

What is claimed is:

1. A method of generating an IFSAR image of a target scene by transmitting and receiving a series of pulses from an IFSAR device having at least a pair of receiving antennas, the distance between said antenna phase centers being represented by a baseline projection, comprising:
    compensating for variations in the data collection geometry for each antenna by adjusting the baseline projection during image generation.

2. The method of claim 1 wherein said compensation is a function of the change in grazing angle, azimuth angle, and/or range between successive pulses.

3. The method of claim 2 wherein said compensation comprises adjusting the baseline projection according to the relationship $$b_{\perp,n,1} = b_{\perp,0,1} \cos\left(\alpha_{n,0}\left(\frac{\cos\psi_{n,0}}{\cos\psi_{0,0}}\right)\right)^2 \left|\frac{r_{c,n,0}}{r_{c,0,0}}\right|,$$

where $b_{\perp,n,1}$ is the baseline projection between two antennas for pulse n, $b_{\perp,0,1}$ is the projection for pulse 0, $\alpha$ is the azimuth angle, $\psi$ is the grazing angle, and r is a vector from scene center to the target location.

4. The method of claim 1 wherein said compensation occurs during a pulse.

5. The method of claim 4 wherein said compensation during a pulse compensates for the variation in frequency content of the pulse.

6. The method of claim 1 further comprising the additional steps of:

forming a data set describing a rectangular parallelepiped in the spatial domain with dimensions $s_x$, $s_y$, and $s_z$, the target scene being a single reflecting surface within said parallelepiped;

determining the maximum peak in the $s_z$ direction for each $s_x$, $s_y$ pair; and determining height information at each horizontal location from the peaks.

7. The method of claim 6 wherein said IFSAR device includes at least three antennas, said antennas being spaced along the baseline projection to minimize the number of maximum peaks for each $s_x$, $s_y$ pair.

8. A method of generating an IFSAR image of a target from an IFSAR device having at least a pair of receiving antennas, comprising processing the data generated by the device by the steps of:

forming a collection surface in Fourier space for each antenna;

forming a height transform across all collection surfaces; and subsequently to said height transform, processing azimuth and range information to form an IFSAR image.

9. The method of claim 8 further comprising correcting each height-transformed collection surface for layover and height-of-focus perturbations prior to processing azimuth and range information.

10. A method of generating an IFSAR image of a target scene by transmitting and receiving a series of pulses from an IFSAR device having at least a pair of receiving antennas, comprising:

compensating for variations in the data collection geometry for each antenna by adjusting radar waveform parameters to force equal projections to a horizontal plane in the Fourier space of the scene.

11. The method of claim 10 wherein adjusting radar waveform parameters comprises adjusting the bandwidth of the data.

12. The method of claim 11 wherein adjusting radar waveform parameters comprises adjusting sampling times and rates for an ADC connected to each antenna.

* * * * *